March 29, 1938.　　P. J. GILLESPIE　　2,112,337
MEANS FOR DRAWING-OFF SLIVERS IN COMBING MACHINES, GILL BOXES, OR OTHER MACHINES FOR PREPARING TEXTILE FIBERS FOR SPINNING
Filed June 1, 1937
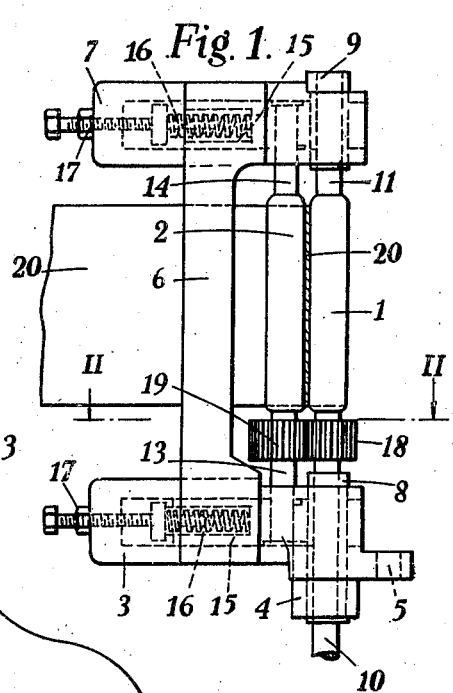
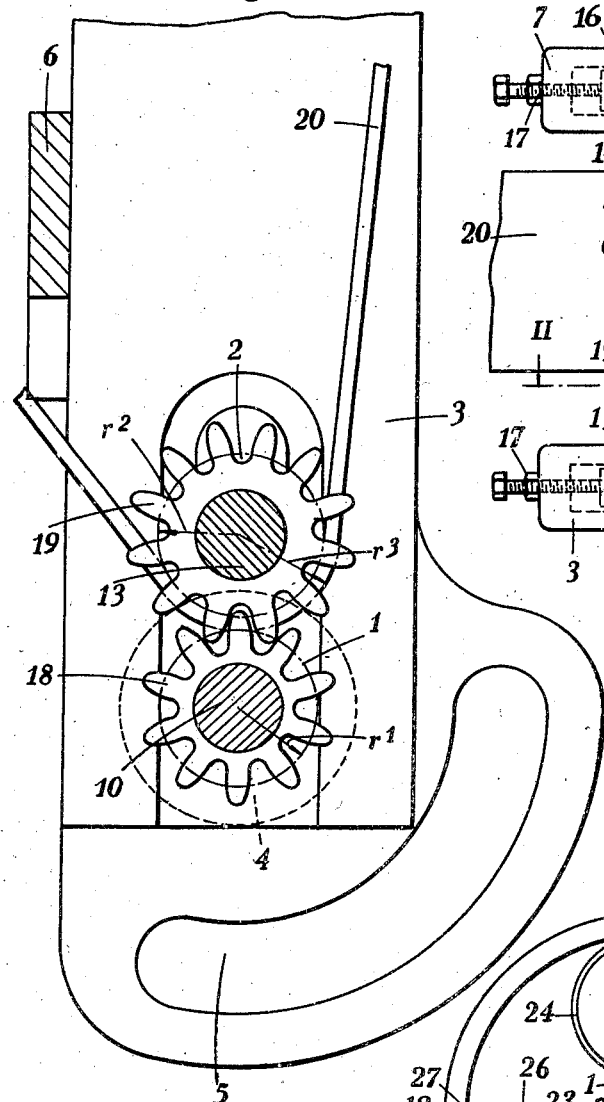
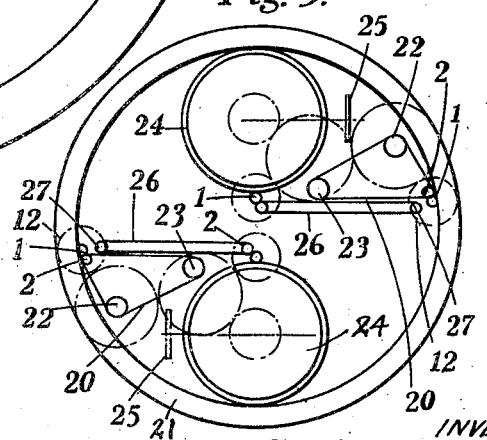

Patented Mar. 29, 1938

2,112,337

UNITED STATES PATENT OFFICE 2,112,337

MEANS FOR DRAWING-OFF SLIVERS IN COMBING MACHINES, GILL BOXES, OR OTHER MACHINES FOR PREPARING TEXTILE FIBERS FOR SPINNING

Percy Joseph Gillespie, London, England

Application June 1, 1937, Serial No. 145,876
In Great Britain June 6, 1936

5 Claims. (Cl. 19—122)

This invention provides improved means for drawing-off slivers in machines for preparing textile fibers for spinning.

An object of the invention is to provide means for drawing-off slivers of textile fibers, comprising, in combination, two rollers having at the most slightly roughened surfaces, an endless flexible band of rubber composition interposed between the rollers and passing round one of them, the common plane of the axes of the rollers being located within the sector defined by the radial planes through the lines at which the band first and last contacts with the roller about which it passes, means pressing the rollers together into engagement with the band, and means positively gearing the rollers together for rotation in opposite directions, the ratio of the radii of said rollers and the ratio of said gearing means jointly causing the peripheral speed of the roller round which the band passes to be less than the peripheral speed of the other roller in proportion to the peripheral speeds of the inner and outer surfaces of the band when in contact with the rollers.

Positive gearing of drawing-off rollers having an endless band passing about one of them was long ago proposed and attempted, but this was abandoned in favour of the now common use of a pair of deeply fluted rollers, namely a driving roller mounted in fixed bearings and positively rotated, and an idle press roller mounted on slides borne upon by springs urging the rollers together, with an endless band of leather embracing the press roller, the deep flutes corrugating the leather and serving to drive the press roller and the leather.

In none of the prior proposals was it suggested that the peripheral speeds of the rollers should be coordinated to the speeds of the inner and outer surfaces of the band, and the important fact that owing to the thickness of the band the effective speed of its outer surface is greater than the speed of its inner surface, in the zone where it co-operates with the rollers, was ignored.

In drawing-off means according to the invention, the radii of the rollers and/or the ratio at which they are geared together may be varied as desired, so long as the product of the radius and angular velocity of the one roller bears a ratio to the product of the radius and the angular velocity of the other roller which ensures the difference of their peripheral speeds above mentioned. For example, the rollers may be of the same size and have angular velocities in the required ratio. Alternatively, the rollers may be geared together so as to have equal speeds of rotation, and be of diameters differing in the required ratio.

An embodiment of the invention as applied to a Noble combing machine will be described by way of example with reference to the accompanying drawing wherein:—

Fig. 1 is an elevation of a pair of drawing-off rollers with supporting means;

Fig. 2 is a plan section (on a larger scale) on the line II—II of Fig. 1; and

Fig. 3 is a diagrammatic plan view of the comb circles of the machine showing the disposition of the drawing-off rollers.

The rollers 1, 2 are mounted in pairs, as shown in Fig. 1, in supporting means constituted by a lower block 3 adjustably securable to the machine frame by means of a spigot 4, engaging a corresponding socket in the frame, and an arcuate slot 5 (see Fig. 2) concentric with the spigot 4. A stud is passed through the slot 5 into the machine frame to lock the member 3 in any desired position for adjusting the spacing of the rollers from the adjacent comb circles. The block 3 carries an upstanding arm 6 supporting at its upper end a second block 7. The blocks 3 and 7 support sleeves 8 and 9 in which are journalled the lower and upper ends 10 and 11 respectively of the shaft of the roller 1. The lower end 10 of this shaft projects downwardly through the spigot 4 and carries means such as a pinion 12 (Fig. 3) whereby the shaft and the roller 1 are positively driven. The upper and lower ends 13 and 14 of the shaft of the roller 2 are supported in slides 15 housed in cylindrical recesses in the blocks 3 and 7. The slides 15 are engaged by compression coil springs 16 serving to urge the roller 2 towards the roller 1. Screw-and-nut means 17 are provided in the ends of the blocks 3 and 7 for adjusting the force exerted by the springs 16 and consequently the grip between the rollers 1 and 2.

The foregoing features are known in combination with rollers having deep intermeshing flutes.

According to the invention the rollers 1 and 2 are geared together for ensuring positive rotation thereof in opposite directions. The gearing consists (in the embodiment shown) of a pair of gear wheels 18 and 19 secured respectively to the lower ends 10 and 13 of the roller shafts. These gear wheels have teeth formed after the manner shown in Fig. 2 so that displacement of the spring-pressed roller 2 from the roller 1 does not interfere with the positive gearing together of the said rollers.

The surfaces of the rollers 1 and 2 are at the most slightly roughened; for example, they may be scratch-fluted or have file-pattern or matt surfaces. Alternatively, either or both of the rollers may be smooth. About the roller 2, and between it and the roller 1, there passes a drawing-off band 20 which according to a feature of the invention is of rubber or rubber composition, resilient and resistant to oil and heat, having substantially smooth inner and outer surfaces, endlessly moulded or otherwise made, and optionally having a textile or woven metal core.

The pitch radius of the gear wheel 18 is equal to the radius $r^1$ of the roller 1, and the pitch radius of the gear wheel 19 is equal to the radius $r^3$, which is equal to the sum of the radius $r^2$ of the roller 2 and the thickness of the band. The numbers of teeth in the gear wheels 18 and 19 are in the ratio of the radii $r^1$ and $r^3$. In a particular instance, such as that shown in Fig. 2, the radii $r^1$ and $r^2$ are both equal to $\frac{5}{8}''$ and the thickness of the band 20 is $\frac{1}{8}''$. The ratio of the radii $r^1 : r^3$ is thus 5:6, and accordingly the gear wheel 18 has ten teeth while the gear wheel 19 has twelve teeth. The advantageous result of this feature is that the peripheral speed of the roller 1 is equal to the speed of the outer surface of the band 20 with which it is in contact, and the peripheral speed of the roller 2 is equal to the speed of the adjacent inner surface of the band. Thereby, hurtful rubbing contact between the surfaces of the band and the rollers, and hunting as between the inner and outer surface layers of the band in and adjacent the nip of the rollers are minimized, and the rollers engage the surfaces of the band with substantially pure rolling contacts. Local variations in the quality of the slivers drawn off are thus avoided, while the life of the band is considerably prolonged.

The parts shown in detail in Figs. 1 and 2 are located in a machine as shown diagrammatically in Fig. 3. Two pairs of drawing-off rollers 1, 2 are disposed diametrically oppositely, adjacent the inner side of the outer comb circle 21, with a band 20 running round each of the rollers 2 and idler or jockey pulleys 22, 23 arranged to cause the band to follow a triangular course and direct the drawn-off slivers towards the usual receiving funnels. Further pairs of drawing-off rollers 1, 2 are located adjacent the outer surfaces of the small comb circles 24 where these approach nearest to one another at the centre of the machine. Endless bands 26 of rubber or rubber composition pass about jockey pulleys 27 and the rollers 2 of each of the last mentioned pairs of rollers, which are also geared together as shown in Figs. 1 and 2. The divider wheels 25 are located each between the side of one of the small circles 24 and the adjacent drawing-off band 20.

The maximum movement of the slide blocks 15 under the action of the springs 16 is such that the band 20 is compressed between the rollers 1 and 2 to secure adequate grip on the fibers to be drawn from the combs without the points of the teeth on either of the gear wheels 18 or 19 coming into contact with the roots of the teeth on the other wheel. At the same time the rollers are enabled to spring apart under the expansive force of the fibers drawn from the combs, between the band 20 and the roller 1, without interruption of the positive driving of the rollers.

In an alternative arrangement the rollers 1 and 2 may be geared together to rotate at equal angular speeds, the desired ratio of their peripheral speeds being attained by making them of different radii. For example, in a variation of the arrangement shown in Fig. 2, the roller 1 may have a radius equal to the radius $r^3$ and the gear wheel 18 have a number of teeth equal to the number of teeth on the gear wheel 19. It is also possible to have different numbers of teeth on the wheels 18 and 19, in combination with rollers 1 and 2 of unequal diameters so long as the various factors are related to effect the required relation between the peripheral speeds of the rollers.

Evidently, the intermeshing pinions on the shafts of the rollers may be alternatively disposed above the rollers, or such pinions may be duplicated above and below the rollers. Further, the drive means may include a chain, for example, extending from a sprocket on the shaft of one of the rollers to a sprocket on a lay shaft which is connected by a spur gear pair to the shaft of the other roller; this arrangement ensures the adjustability of the pass between the rollers with the use of accurately formed gears, and also affords the necessary rotation of the rollers in opposite directions.

The invention affords several advantages over the known drawing-off means in that corrugated or deeply fluted drawing-off rollers are eliminated without detriment to the efficacy of the grip of the drawing-off band or bands upon the fibers undergoing treatment. The external surface or surfaces of the band or bands is or are enabled to follow a substantially circular smooth course through the nip of the rollers and thereby exert a continuous tension on the fibers, instead of a spasmodic tension as heretofore. Further, since the material of a band is not subjected to continual severe distortion as in the passage between a pair of corrugated or deeply fluted rollers, the life of each band is greatly increased, and the effectual employment of bands of rubber, rubber composition or the like becomes a practical possibility due to the fact that they are not subjected to any influence which can cause them to crumble and result in spoiling of the slivers by picking up crumbled particles. Thus, considerable economies are effected in the operation of combing machines, gill boxes and the like, since the first cost of rubber, rubber composition or like drawing-off bands is a fraction of that of comparable leather bands.

I claim:—

1. Means for drawing-off slivers of textile fibers, comprising, in combination, two rollers having at the most slightly roughened surfaces, an endless flexible band of rubber composition interposed between the rollers and passing round one of them, the common plane of the axes of the rollers being located within the sector defined by the radial planes through the lines at which the band first and last contacts with the roller about which it passes, means pressing the rollers together into engagement with the band, and means positively gearing the rollers together for rotation in opposite directions, the ratio of the radii of said rollers and the ratio of said gearing means jointly causing the peripheral speed of the roller round which the band passes to be less than the peripheral speed of the other roller in proportion to the peripheral speeds of the inner and outer surfaces of the band when in contact with the rollers.

2. Means for drawing-off slivers of textile fibers, comprising, in combination, two rollers having at the most slightly roughened surfaces, an endless flexible band of rubber composition interposed between the rollers and passing round one of them, the common plane of the axes of the rollers being located within the sector defined by the radial planes through the lines at which the band first and last contacts with the roller about which it passes, means pressing the rollers together into engagement with the band, and means positively gearing the rollers together for rotation in opposite directions, said rollers being of equal radius, and the ratio of said gearing means being equal to the ratio of said radius to the sum of said radius and the thickness of the band to cause the peripheral speed of the roller round which the band passes to be less than the peripheral speed of the other roller in proportion to the peripheral speeds of the inner and outer surfaces of the band when in contact with the rollers.

3. Means for drawing-off slivers of textile fibers, comprising, in combination, two rollers having at the most slightly roughened surfaces, an endless flexible band of rubber composition interposed between the rollers and passing round one of them, the common plane of the axes of the rollers being located within the sector defined by the radial planes through the lines at which the band first and last contacts with the roller about which it passes, means pressing the rollers together into engagement with the band, and means positively gearing the rollers together for rotation in opposite directions, the radii of said rollers being different, and the ratio of said gearing means being such that the product of the radius and the angular velocity of the roller engaging the outer surface of the band is greater than the product of the radius and the angular velocity of the roller about which the band passes in the ratio of the sum of the thickness of the band and the radius of said last-mentioned roller to the radius of the same roller.

4. Means for drawing-off slivers of textile fibers, comprising, in combination, two rollers having at the most slightly roughened surfaces, an endless flexible band of rubber composition interposed between the rollers and passing round one of them, the common plane of the axes of the rollers being located within the sector defined by the radial planes through the lines at which the band first and last contacts with the roller about which it passes, means pressing the rollers together into engagement with the band, and means positively gearing the rollers together for rotation in opposite directions, the radius of the roller engaging the outer surface of the band being equal to the sum of the radius of the roller about which the band passes and the thickness of the band, and the gearing means imparting equal angular velocities to the rollers.

5. Means for drawing-off slivers of textile fibers, comprising, in combination, two rollers having at the most slightly roughened surfaces, slidable bearing members mounting at least one of said rollers for displacement relative and parallel to the other, an endless flexible band of rubber composition interposed between the rollers and passing round one of them, the common plane of the axes of the rollers being located within the sector defined by the radial planes through the lines at which the band first and last contacts with the roller about which it passes, means pressing the rollers together into engagement with the band, and means positively gearing the rollers together for rotation in opposite directions, the ratio of the radii of said rollers and the ratio of said gearing means jointly causing the peripheral speed of the roller round which the band passes to be less than the peripheral speed of the other roller in proportion to the peripheral speeds of the inner and outer surfaces of the band, and said gearing means including at least one pair of intermeshing gear wheels having their teeth elongated to enable continued and positive drive transmission between the rollers notwithstanding relative displacement of the rollers.

PERCY JOSEPH GILLESPIE.